Figure 3:
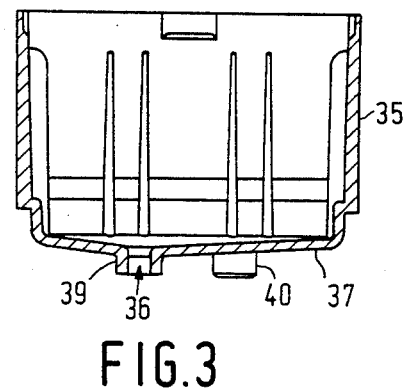

United States Patent [19]

Da Silva

[11] Patent Number: 4,550,652

[45] Date of Patent: Nov. 5, 1985

[54] COFFEE MAKER

[75] Inventor: Artur F. Da Silva, Sao Paulo, Brazil

[73] Assignee: U.S. Philips Corporation, New York, N.Y.

[21] Appl. No.: 543,746

[22] Filed: Oct. 20, 1983

[30] Foreign Application Priority Data

Oct. 26, 1982 [BR] Brazil .................................. 8206233

[51] Int. Cl.[4] ............................................. A47J 31/00
[52] U.S. Cl. ....................................... 99/279; 99/295; 222/486
[58] Field of Search ............. 99/295, 298, 300, 302 R, 99/304, 306, 307, 316, 279, 281, 309; 426/433; 222/485, 486

[56] References Cited

U.S. PATENT DOCUMENTS

| | | | |
|---|---|---|---|
| 1,662,547 | 3/1928 | Urtis | 99/302 |
| 2,052,476 | 8/1936 | Koch | 99/298 |
| 2,152,410 | 3/1939 | Illy | 99/316 |
| 3,824,914 | 7/1974 | Casiano | 99/302 R |
| 3,935,805 | 2/1976 | Ihlenfeld | 99/300 |

*Primary Examiner*—Robert W. Jenkins
*Attorney, Agent, or Firm*—Schneider, Rolf E.

[57] ABSTRACT

A coffee maker comprises a housing; a filtering device for arrangement in the housing, the filtering device having a single outlet; and a distributor for positioning in the housing below the filtering device. The distributor has a plurality of inlets and an equal number of outlets and a duct system interposed between the inlets and the outlets. The filtering device is positionable in the housing with its outlet sequentially in contact with each distributor inlet. The duct system is so formed that it connects each distributor inlet in sequence with the distributor outlets.

4 Claims, 11 Drawing Figures

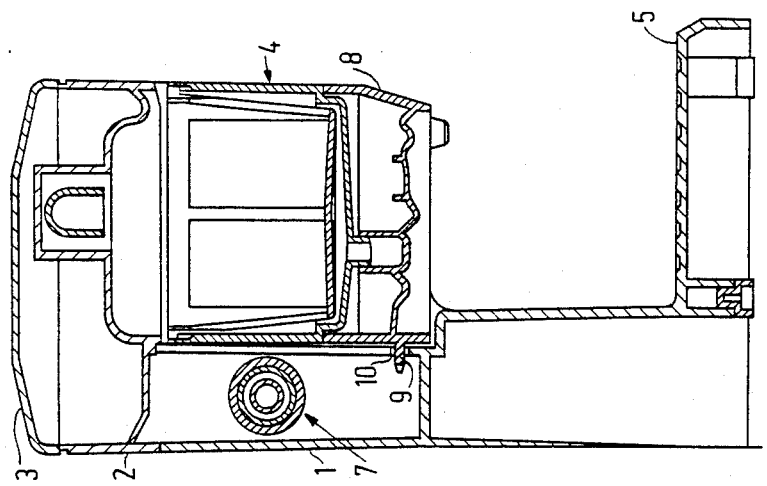
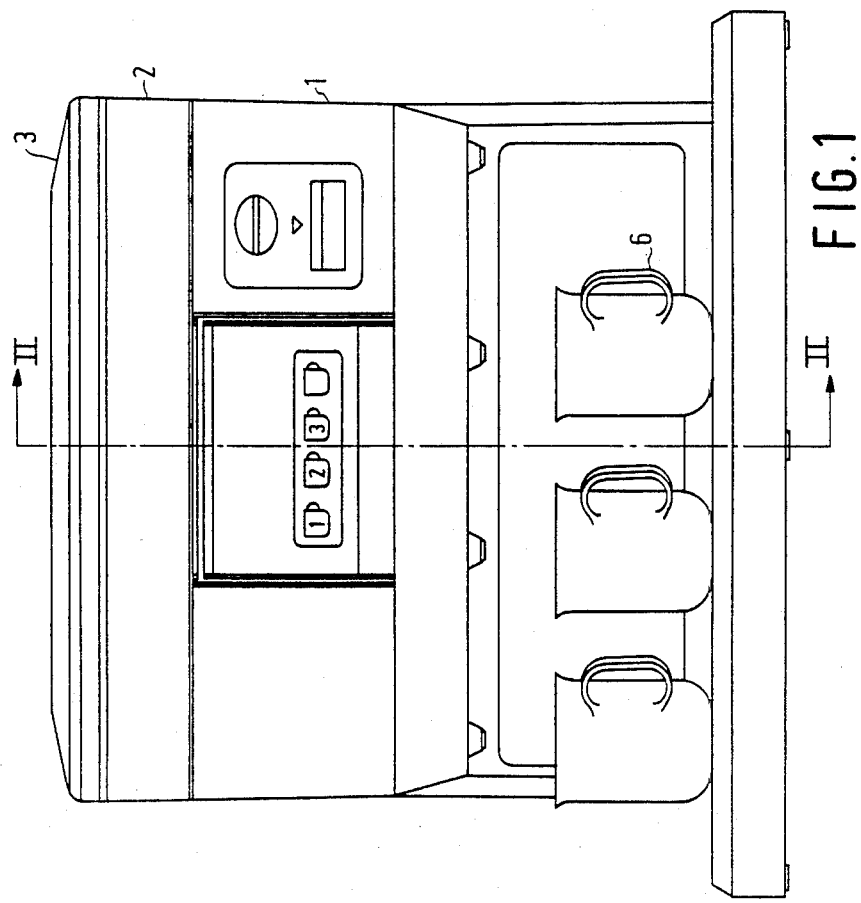

COFFEE MAKER

This invention relates to a coffee maker comprising a housing in which can be arranged a filtering device provided with one outlet opening.

Such a coffee maker is generally known. A coffee maker is also known by means of which - by choice - one cup of coffee or two cups of coffee at a time are obtained. For this purpose, the filtering device has two outlet openings which are arranged at such a relative distance that one cup fits beneath both outlet openings or two cups arranged one beside the other fit each beneath one outlet opening.

The present invention has for its object to provide a coffee maker in which by choice one, two, three ... x cups can be filled at a time with coffee. Preferably, this number is larger than two.

A coffee maker according to the invention is provided for this purpose with a distributor having x inlet openings and x outlet openings and an interposed duct system. The filtering device can be arranged in x-fold in the apparatus in such a manner that the outlet opening of the filtering device is located just above one of the inlet openings of the distributor.

Depending upon the number of cups of coffee that is desired, the filtering device is arranged in the apparatus in the desired manner. The coffee flows from the outlet opening of the filtering device into the relevant inlet opening of the distributor and then through the duct system to the desired number of outlet openings of the distributor and subsequently into the cups.

Preferably, the duct system is constituted by gutters, the $x^{th}$ inlet opening being connected to x outlet openings.

An embodiment is characterized in that the distributor has four inlet openings and four outlet openings, the four inlet openings being located at the angular points of an imaginary square and the four outlet openings being arranged in a row, whilst the filtering device is in the form of a square.

Since due to the use of a distributor the coffee has to cover a longer distance to the cup, the temperature of the coffee will decrease more quickly than in the known coffee makers. In order to compensate for this decrease in temperature, the coffee maker according to the invention may be provided with means for heating the distributor.

Figure 4:
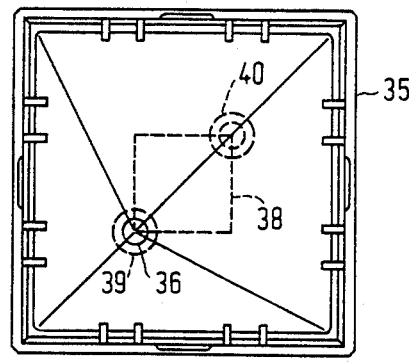
Figure 5:
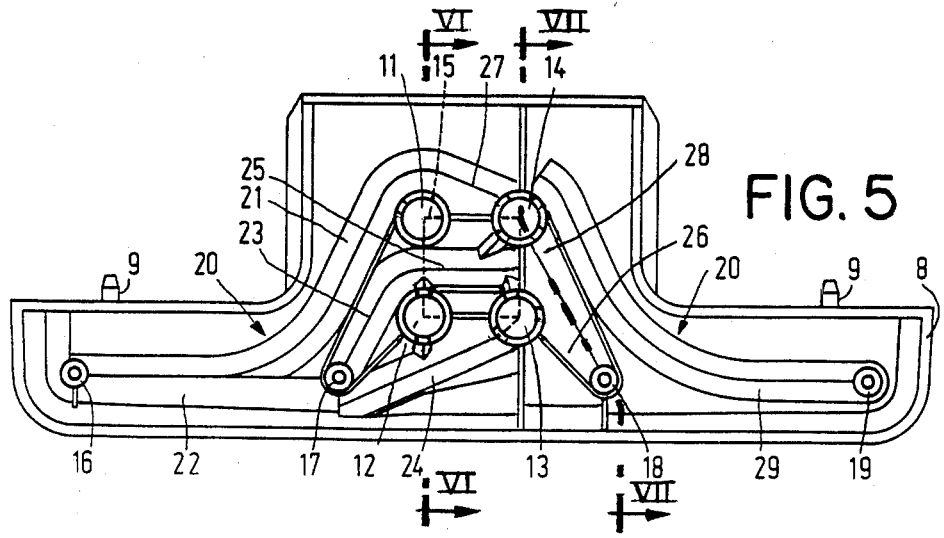
Figure 6:
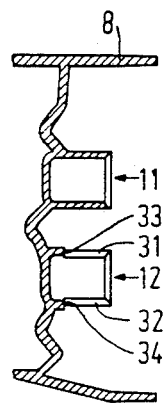
Figure 7:
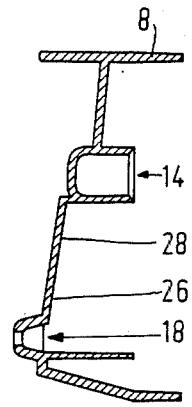
Figure 8:
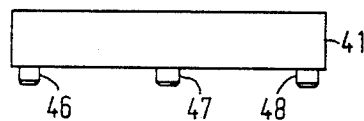
Figure 10:
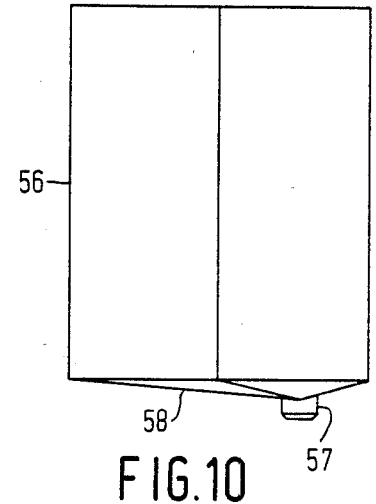
Figure 9:
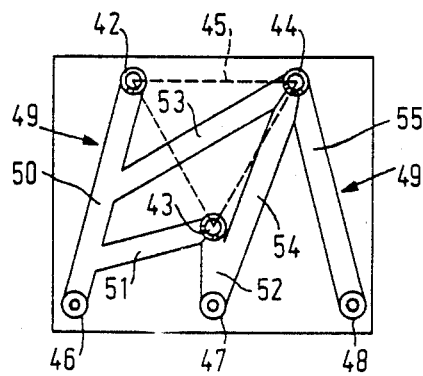
Figure 11:
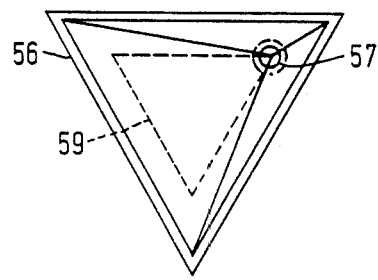

The invention will now be described more fully with reference to two embodiments shown in the accompanying drawings, in which:

FIG. 1 is a front elevation of a first embodiment of a coffee maker according to the invention, FIG. 2 is a cross-sectional view of the coffee maker of FIG. 1 taken on the line II—II, FIG. 3 is a cross-sectional view on an enlarged scale of the holder for the filter container of the coffee maker of FIG. 1, FIG. 4 is a plan view of the holder for the filter container shown in FIG. 3, FIG. 5 is a plan view on an enlarged scale of the distributor of the coffee maker of FIG. 1, FIG. 6 is a cross-sectional view of the distributor shown in FIG. 5 taken on the line VI—VI, FIG. 7 is a cross-sectional view of the distributor shown in FIG. 5 taken on the line VII—VII, FIG. 8 is a front elevation of a distributor intended to be used in a second embodiment of a coffee maker according to the invention, FIG. 9 shows diagrammatically in plan view the distributor shown in FIG. 8, FIG. 10 shows diagrammatically an elevation of a holder for a filter container intended to be used with the distributor shown in FIG. 8, FIG. 11 is a plan view of the holder for the filter container shown in FIG. 10.

The coffee maker according to the invention is composed of a housing 1, a water tank 2, a cover 3 for closing the water tank and a filtering device 4 which can be arranged in the housing. Beneath the filtering device one to four cups 6 can be arranged on a supporting plate 5. The coffee maker is provided with a flow heater 7, of which (in a manner not shown further) the water duct is connected at one end to the water tank 2 and discharges at the other end by means of a communication duct above the filtering device 4.

According to the invention, the coffee maker is provided with a distributor 8 which can be detachably arranged in the housing 1. The distributor is provided for this purpose with pins 9 which fit into openings 10 of the housing (see FIG. 2). In the embodiment shown in FIGS. 1 to 7, the distributor is provided with four inlet openings 11, 12, 13 and 14. The inlet openings are located at the angular points of an imaginary square 15. The reason for this arrangement will be explained hereinafter. The distributor is further provided with four outlet openings 16, 17, 18 and 19, which are disposed in a straight line. Beneath these outlet openings the cups 6 can be arranged. Between the inlet openings and the outlet openings there is provided a duct system 20 such that the inlet opening 11 is connected by means of a duct 21 to the outlet opening 16, the inlet opening 12 is connected by means of ducts 24/22 and 23 to outlet openings 16 and 17, respectively, the inlet opening 13 is connected by means of ducts 24/22, 25/23 and 26 to the outlet openings 16, 17 and 18, respectively, and the inlet opening 14 is connected by means of ducts 27/21, 25/23, 28/26 and 29 to all four outlet openings 16, 17, 18 and 19 respectively. The ducts are constituted by open preferably V-shaped gutters, as is apparent from FIG. 6. The bottom of each duct is slightly inclined downwards from the inlet openings to the outlet openings. The inlet openings are constituted by upright pipes which are open on the upper side and closed on the lower side. The outlet ports of the inlet openings are constituted by vertical slots extending from the upper edge of a pipe. As seen in FIG. 6, the outlet opening 12 is constituted by a pipe having two outlet ports (slots) 31 and 32. In order to obtain a uniform distribution of the coffee flowing in the ducts and hence of the quantity of coffee in the cups, the lower edges 33, 34 of the outlet ports 31, 32 are located at the same distance from the closed bottom of the pipe having the two outlet parts. This holds for all the pipes having more than one outlet port. It can be seen in FIG. 7 how the coffee can flow from the inlet opening 14 through the ducts 28/26 to the outlet opening 18. It will be clear from the foregoing that, depending upon the inlet opening through which the coffee enters the distributor, it has been determined through which of the outlet openings the coffee flows outwards into the cups.

The filtering device 4 is constituted by a holder 35 in which a filter container (not shown), of which the bottom and, as the case may be, also the side walls are provided with filtering material, can be detachably arranged. The holder for the filter container is provided with one outlet opening 36, which is located in the bottom 37. The holder for the filter container can be arranged above the distributor 8 in such a manner that the outlet opening 36 is located just above one of the inlet openings 11, 12, 13 and 14 of the distributor. For this purpose, the holder for the filter container is in the form of a square and the outlet opening 36 is located at one of the angular points of the imaginary square 38 (see FIG. 4). This imaginary square 38 corresponds to the aforementioned imaginary square 15 at whose angular points are located the inlet openings of the distributor. The bottom 37 of the holder for the filter container is provided with a short downwardly directed pipe 39 in which the outlet opening 36 is provided. The outer dimension of the pipe 39 is such that it tightly fits into one of the pipes of the distributor. In order that the holder for the filter container is positioned very accurately on the distributor, the bottom 37 is further provided with a downwardly directed cam 40 which with regard to the outer dimension corresponds to the pipe 39. The cam 40 is arranged at the angular point of the imaginary square 38 diametrically opposite to the pipe 39. The cam thus fits into one of the pipes of the distributor. Since the square holder for the filter container is symmetrical with regard to its outer dimensions, the holder can be arranged in four different ways on the distributor, the outlet opening 36 being located each time above another inlet opening of the distributor.

FIGS. 8 to 11 show diagrammatically an embodiment of a distributor and a holder for a filter container intended to be used in a coffee maker with which at most three cups of coffee can be made at a time. The distributor 41 is provided with three inlet openings 42, 43 and 44, which are located at the angular points of an imaginary equilateral triangle 45 and with three outlet openings 46, 47 and 48 located on a straight line. Between the inlet openings and the outlet openings there is situated a duct system 49 which is constituted in a manner similar to that in which the duct system of the first embodiment is constituted. The inlet opening 42 is connected through a single duct 50 to the outlet opening 46, the inlet opening 43 is connected through a duct 51 merging into the duct 50 and through a duct 52 to the outlet openings 46 and 47, respectively, and the inlet opening 44 is connected through a duct 53 merging into the duct 50, through a duct 54 and through a duct 55 to the outlet openings 46, 47 and 48, respectively.

The holder 56 for a filter container forming part of this embodiment has a prismatic form, whose cross-section is an equilateral triangle, the outlet opening 57 being located in the slightly inclined bottom 58 of the holder at an angular point of an imaginary equilateral triangle 59 which corresponds to the aforementioned imaginary equilalteral triangle 45 of the distributor 41.

It will be appreciated that the holder 56 for the filter container can be arranged in three ways above the distributor in such a manner that the outlet opening is located just above one of the inlet openings of the distributor.

Coffee makers of this kind by which more than four cups of coffee can be made at a time are of course also possible. In this case, the outlet opening of the holder for the filter container will then have to be situated so that in the different positions occupied by the holder for the filter container with respect to the distributor the outlet opening is located at the angular points of an imaginary uniform polygon. The inlet openings on the distributor are then of course also located at the angular points of the same imaginary uniform polygon. The maximum number of cups of coffee to be made at a time is then equal to the number of angular points of the imaginary polygon. It is alternatively possible to give the filtering device the form of a cylinder and to secure it rotatably and detachably in the coffee maker.

Since in the coffee maker according to the invention due to the presence of the distributor the coffee flowing from the outlet opening of the holder for the filter container has to cover a longer distance until it flows into the cups than in coffee makers in which the coffee flows directly into the cups, a greater decrease in temperature will occur. This may be compensated for by using means for heating the distributor. This may be effected, for example, by means of a separate heating element incorporated in the distributor or by means of pins which are in thermal contact with the heating element of the flow heater and onto which the distributor can be slipped.

What is claimed is:

1. A coffee maker which comprises a housing; a filtering device for arrangement in the housing, said filtering device having a single outlet; and a distributor for positioning in the housing below the filtering device, said distributor having a plurality of inlets and an equal number of outlets and a duct system interposed between said inlets and said outlets; the filtering device being positionable in said housing with its outlet sequentially in contact with each distributor inlet; and the duct system being so formed that it connects each distributor inlet in sequence with the distributor outlets.

2. A coffee maker according to claim 1, in which the distributor has four inlets and four outlets, the four inlets being located at the angular points of an imaginary square and the four outlets being arranged in a row, and the filtering device has a corresponding square form.

3. A coffee maker according to claim 1, in which the duct system is constituted by gutters.

4. A coffee maker according to claim 1, which includes means for heating the distributor.

* * * * *